United States Patent
Iida et al.

(10) Patent No.: US 10,163,225 B2
(45) Date of Patent: Dec. 25, 2018

(54) OBJECT STATE IDENTIFICATION METHOD, OBJECT STATE IDENTIFICATION APPARATUS, AND CARRIER

(71) Applicants: MURATA MACHINERY, LTD., Kyoto-shi, Kyoto (JP); UMEMURA Educational Institutions, Nagoya-shi, Aichi (JP)

(72) Inventors: Masaomi Iida, Kyoto (JP); Manabu Hashimoto, Aichi (JP); Shoichi Takei, Aichi (JP)

(73) Assignees: MURATA MACHINERY, LTD, Kyoto (JP); UMEMURA EDUCATIONAL INSTITUTIONS, Aichi (JP)

( * ) Notice: Subject to any disclaimer, the term of this patent is extended or adjusted under 35 U.S.C. 154(b) by 39 days.

(21) Appl. No.: 15/440,104

(22) Filed: Feb. 23, 2017

(65) Prior Publication Data
US 2017/0243372 A1 Aug. 24, 2017

(30) Foreign Application Priority Data
Feb. 23, 2016 (JP) .................................. 2016-032526

(51) Int. Cl.
*G06T 7/00* (2017.01)
*G06T 7/73* (2017.01)
*G06T 7/13* (2017.01)

(52) U.S. Cl.
CPC .................. *G06T 7/75* (2017.01); *G06T 7/13* (2017.01); *G06T 2207/10028* (2013.01)

(58) Field of Classification Search
CPC .... G06T 7/75; G06T 7/13; G06T 2207/10028
(Continued)

(56) References Cited

U.S. PATENT DOCUMENTS

2012/0155706 A1* 6/2012 Honjo ................ G01B 11/2513
382/103
2013/0230235 A1* 9/2013 Tateno .................. G06T 19/003
382/154
(Continued)

FOREIGN PATENT DOCUMENTS

| JP | 09-218014 A | 8/1997 |
| JP | 2015-225453 A | 12/2015 |
| WO | 2010/140613 A1 | 12/2010 |

OTHER PUBLICATIONS

Hashimoto, "Three-dimensional characteristic quantity for distance data handling", Chukyo University, Graduate school, Information science graduate course, Mar. 5, 2015, pp. 1-15.

*Primary Examiner* — Ping Y Hsieh
(74) *Attorney, Agent, or Firm* — Keating & Bennett, LLP

(57) ABSTRACT

An object state identification method of identifying a position and a posture of an object by obtaining actual measured values at a plurality of points on a flat portion including an opening on a surface of the object by a sensor includes generating a model value group that is a set of model values indicating the positions of a plurality of points present on surfaces of a corner model, calculating a model feature value based on at least one model value included in the model value group, calculating an actual feature value by the same method used to calculate the model feature value, extracting a corresponding point value indicating a position of an edge of the opening based on the actual feature value that matches the model feature value, and identifying the position and posture of the object based on the corresponding point value.

7 Claims, 11 Drawing Sheets

(58) Field of Classification Search
USPC .......................................................... 382/103
See application file for complete search history.

(56) References Cited

U.S. PATENT DOCUMENTS

2015/0347840 A1* 12/2015 Iida ......................... B66F 9/063
                                                                  382/103
2016/0104274 A1*  4/2016 Jovanovski .......... G05B 19/402
                                                                   348/46
2017/0228885 A1*  8/2017 Baumgartner ............ G06T 7/62

* cited by examiner

OBJECT STATE IDENTIFICATION METHOD, OBJECT STATE IDENTIFICATION APPARATUS, AND CARRIER

CROSS REFERENCE TO RELATED APPLICATIONS

This application claims the benefit of priority to Japanese Patent Application No. 2016-032526 filed on Feb. 23, 2016. The entire contents of this application are hereby incorporated herein by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are (1) Murata Machinery, Ltd., and (2) Umemura Educational Institutions.

BACKGROUND OF THE INVENTION

1. Field of the Invention

The present invention relates to an object state identification method, an object state identification apparatus, and a carrier including an object state identification apparatus to identify the state of an object such as the position and posture thereof. In particular, the present invention relates to an object state identification method, an object state identification apparatus, and a carrier, each of which identifies an object state indicating the position, posture, etc., of an object including a flat portion including an opening on a surface of the object when an automated guided carrier or the like holds the object.

2. Description of the Related Art

Various object state identification methods for identifying an object state based on information of an image captured of an object have been proposed.

For example, Japanese Unexamined Patent Application Publication No. H09-218014 discloses a device which generates three-dimensional information including distance information of each point on an object based on two data pieces of images captured by a pair of cameras provided at different positions, and identifies the object state based on the three-dimensional information.

International Publication No. 2010/140613 discloses a device which calculates feature values by creating a histogram from feature points of distance information (three-dimensional information) of each point on an object, obtained from a time-of-flight (TOF) camera, and compares the feature value with a reference pattern to identify the object.

Japanese Unexamined Patent Application Publication No. 2012-123781 discloses an apparatus which calculates three-dimensional coordinates of an object from two-dimensional information and distance information of each point on the object, and matches the three-dimensional coordinates to three-dimensional model data serving as a reference pattern to identify the state of the object.

In conventional devices that identify the state of an object such as those disclosed in Japanese Unexamined Patent Application Publication No. H09-218014, International Publication No. 2010/140613 and Japanese Unexamined Patent Application Publication No. 2012-123781, feature points of the object are extracted from three-dimensional information obtained by capturing an image of the object, and the state of the object is identified based on the feature points.

In the conventional method, the state of the object is identified by pattern matching, and thus information on the shape of the object to be imaged is required to be known. Therefore, when the shape of an object is unknown, it is almost impossible to identify the state of the object.

SUMMARY OF THE INVENTION

Preferred embodiments of the present invention provide an object state identification method, an object state identification apparatus, and a carrier that accurately identifies the state of an object including on a surface a flat portion including an opening with low calculation load even when a shape of the object is unknown.

An object state identification method according to an aspect of a preferred embodiment of the present invention identifies an object state including at least one of a position and a posture of an object with respect to a sensor by obtaining actual measured values at a plurality of points on a flat portion of the object by the sensor, the actual measured values being three-dimensional data, the flat portion being on a surface of the object and including an opening. The object state identification method includes: generating a model value group that is a set of model values indicating positions of a plurality of points present on at least three different surfaces of a three-dimensional corner model; calculating a model feature value based on at least one model value included in the model value group; calculating an actual feature value based on each of the actual measured values by a method that is same as a method used to calculate the model feature value; extracting a corresponding point value indicating a position of an edge of the opening based on the actual feature value that matches the model feature value; and identifying the object state of the object based on the corresponding point value.

Therefore, it is possible to identify the position and posture of the object quickly and accurately.

The model feature value may be calculated based on a model value included in the model value group and corresponding to a corner.

Therefore, it is possible to accurately extract an actual measured value corresponding to a corner on the edge of the opening.

A local region may be set based on at least one model value included in the model value group, and a total number of model values included in a unit region obtained by dividing the local region or a value calculated from the total number of model values may be calculated as the model feature value.

Thus, the feature value is simplified, making fast processing with low calculation load possible.

Depth information may be extracted from the actual measured value involved in the calculation of the actual feature value, the actual feature value may be multiplied by a coefficient that is a value proportional to a depth variance, the actual feature value after the multiplication may be matched to the model feature value, and the corresponding point value indicating the position of the edge of the opening may be extracted based on the actual feature value that matches the model feature value.

Therefore, the difference between the flat portion and the remaining area becomes significant, making it easy to determine the flat portion.

The model value group may be generated so that spatial density of the actual measured values and spatial density of the model values are equal or substantially equal.

Therefore, it is possible to improve the accuracy of identifying the state of the object.

Furthermore, an object state identification apparatus according to an aspect of a preferred embodiment of the present invention includes: an actual measured value receiver that obtains actual measured values at a plurality of points on a flat portion of an object from a sensor, the actual measured values being three-dimensional data, the flat portion being on a surface of the object and including an opening; a storage that stores a model feature value calculated based on at least one model value included in a model value group that is a set of model values indicating positions of a plurality of points present on at least three different surfaces of a three-dimensional corner model; an actual feature value calculator that calculates an actual feature value based on each of the actual measured values by a method that is same as a method used to calculate the model feature value; a corresponding point extractor that extracts a corresponding point value indicating a position of an edge of the opening based on the actual feature value that matches the model feature value; and an object state identifier that identifies, based on the corresponding point value, an object state including at least one of a position and a posture of the object with respect to the sensor.

Therefore, it is possible to identify the position and posture of the object quickly and accurately.

Furthermore, a carrier according to an aspect of a preferred embodiment of the present invention carries an object with a fork inserted into an opening of a flat portion of the object, the flat portion being on a surface of the object. The carrier includes: a sensor that obtains actual measured values at a plurality of points on the flat portion of the object, the actual measured values being three-dimensional data; and an object state identification apparatus that identifies, based on the actual measured values, an object state including at least one of a position and a posture of the object with respect to the sensor. The object state identification apparatus includes: a storage that stores a model feature value calculated based on at least one model value included in a model value group that is a set of model values indicating positions of a plurality of points present on at least three different surfaces of a three-dimensional corner model; an actual feature value calculator that calculates an actual feature value based on each of the actual measured values by a method that is same as a method used to calculate the model feature value; a corresponding point extractor that extracts a corresponding point value indicating a position of an edge of the opening based on the actual feature value that matches the model feature value; and an object state identifier that identifies the object state based on the corresponding point value.

Therefore, fast feedback of the position and posture of the object under low calculation load is possible, making it possible to hold and carry the object quickly and smoothly.

According to another preferred embodiment of the present invention, a non-tangible computer readable medium includes stored thereon a program that causes causing a computer to execute an object state identification method according to a preferred embodiment of the present invention.

According to various preferred embodiments of the present invention, it is possible to identify the state of an object such as the position and posture thereof quickly and accurately under low calculation load.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
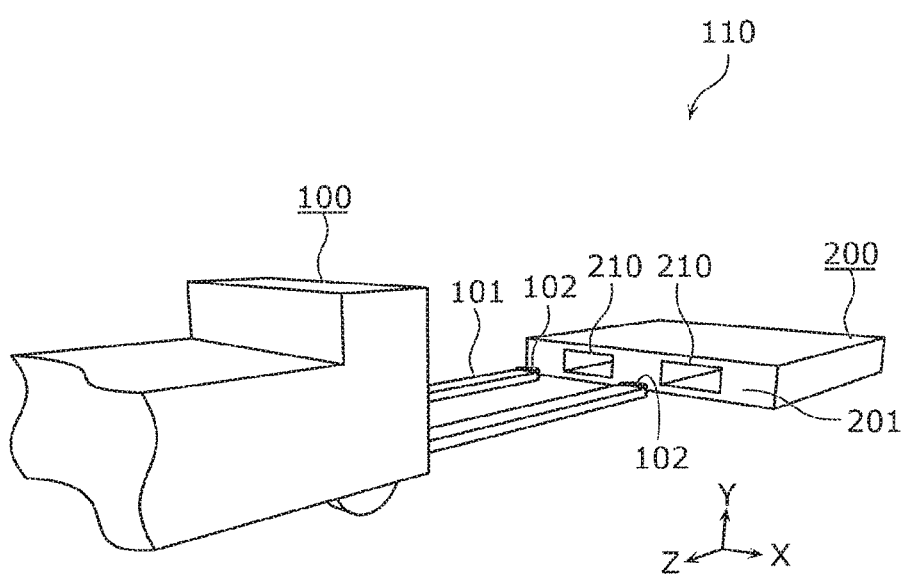
FIG. 1 is a perspective view illustrating an object and a carrier.

Object state identification methods according to preferred embodiments of the present invention will be described with reference to the drawings. Note that the following preferred embodiments are mere examples of the object state identification methods according to the present invention. Therefore, the scope of the present invention is defined by the recitations in the claims, with reference to the following preferred embodiments, and is not limited to only the following preferred embodiments. Thus, among the structural elements in the following preferred embodiments, structural elements not recited in any one of the independent claims which indicate the broadest concepts of the present invention are described as preferred structural elements, and are not absolutely necessary to overcome the problem according to the present invention.

The drawings are schematic illustrations including appropriate emphasis, omission, adjustment in proportion, and so on for the purpose of describing preferred embodiments of the present invention; there are cases where the actual shapes, positional relationship, and proportion are different from those in the drawings.

FIG. 1 is a perspective view illustrating an object and a carrier.

An object 200 includes a flat portion 201 and an opening 210. The type of the object 200 is not particularly limited. Examples of the object 200 include a conveyable article and a static structure difficult to carry.

The flat portion 201 is a portion of a surface of the object 200. The opening 210 is provided in a portion of the flat portion 201.

The opening 210 is an opening end of a hole depressed from the flat portion 201 or a flat portion 201-side opening end of a through-hole extending from the flat portion 201 to an end surface on the other side. The shape of the opening 210 is not particularly limited and may be a square or other suitable shape, for example. The number of openings 210 in the flat portion 201 is not particularly limited. For example, in a single flat portion 201, there may be a single opening 210, or there may be two or more openings 210.

In the present preferred embodiment, the object 200 is a pallet defining and functioning as a board on which a load is placed in distribution facilities and the like. The object 200 defining a pallet preferably is square or substantially square board-shaped in plan view. Two openings 210 are arranged in the flat portion 201 which corresponds to one side of the object 200. The openings 210 each correspond to the opening end of a through-hole extending from the flat portion 201 to the opposite end surface. The two openings 210 are preferably horizontally-elongated rectangular and have the same shape. Furthermore, the two openings 210 are arranged so that the flat portion 201 has line symmetry about an axis passing through the center of the flat portion 201 in the width direction (the X axis direction in the figure) and extending in the vertical direction (the Y axis direction in the figure). The openings 210 preferably are sized to allow insertion of a fork 101 of a carrier 100.

The carrier 100 preferably is a wheeled cart that lifts and carries the object 200, which includes the flat portion 201 including the openings 210 on a surface of the object, with the fork 101 inserted into the openings 210 of the object 200. In the present preferred embodiment, the carrier 100 includes two claws which define the fork 101 and each of which includes a sensor 102 at the distal end thereof. The two claws are arranged in parallel or substantially in parallel with each other and are attached to a carrier system 110 so as to be vertically movable while remaining parallel or substantially parallel to the floor surface on which the carrier 100 runs. The carrier 100 is an automated guided vehicle which is able to autonomously run and carry a load without being attended by persons, and includes an object state identification apparatus 103 (see FIG. 2) therein. The sensor 102 is not limited to being attached to the distal end of the fork 101 and may be attached to a casing of the carrier 100, for example.

The sensor 102 is not particularly limited so long as it is a device that is able to obtain actual measured values which are three-dimensional data at a plurality of points on the flat portion 201 of the object 200 that includes the opening 210. Examples of the sensor 102 include a sensor that includes two cameras and obtains an actual measured value using a parallax between two two-dimensional images, a time-of-flight (TOF) camera which measures the distance to a target for each pixel by measuring, for each imaging pixel, the length of time from when a light-emitting diode (LED) provided around the camera emits infrared light to when the camera observes the light reflected off the target, and a distance sensor that measures the coordinates of a plurality of points and the distances to the plurality of points based on scanned and reflected laser light. In the present preferred embodiment, suppose that the sensor 102 is preferably a TOF camera.

Figure 2:
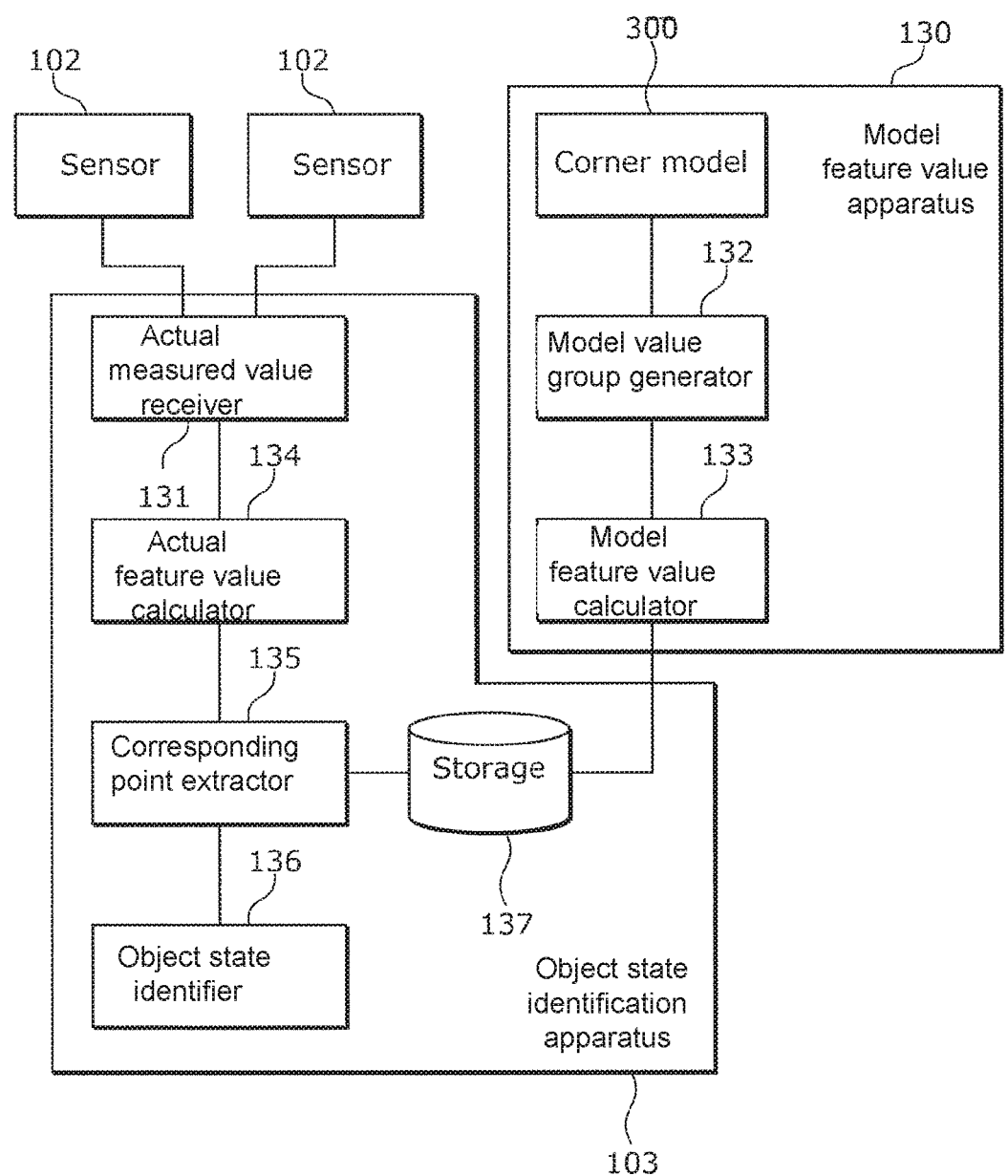
FIG. 2 is a block diagram illustrating a functional configuration of an object state identification apparatus.

FIG. 2 is a block diagram illustrating a functional configuration of the object state identification apparatus.

The object state identification apparatus 103 is a processor or central processor (CPU) that is configured or programmed to identify an object state including at least one of the position and the posture of the object 200 with respect to the sensor 102. The object state identification apparatus 103 is configured or programmed to include, as part of the processor or CPU defining the object state identification apparatus 103 or as additional processors included in the object state identification apparatus 103, each of the following: an actual measured value receiver 131, an actual feature value calculator 134, a corresponding point extractor 135, an object state identifier 136, and a storage (memory) 137.

Note that the carrier 100 preferably includes the object state identification apparatus 103. The carrier system 110 preferably includes the carrier 100 and a model feature value calculation apparatus 130.

The model feature value calculation apparatus 130 is a processor or CPU that calculates a model feature value in advance, and is configured or programmed to include, as part of the processor or CPU defining the model feature value calculation apparatus 130 or as additional processors included in the model feature value calculation apparatus 130, each of a model value group generator 132 and a model feature value calculator 133.

The model value group generator 132 is a processor that generates a model value group which is a set of model values indicating the positions of a plurality of points present on at least three different surfaces of a three-dimensional corner model.

The corner model preferably is a model similar to the shape of a portion cut out of the opening 210 of the object 200.

Figure 4:
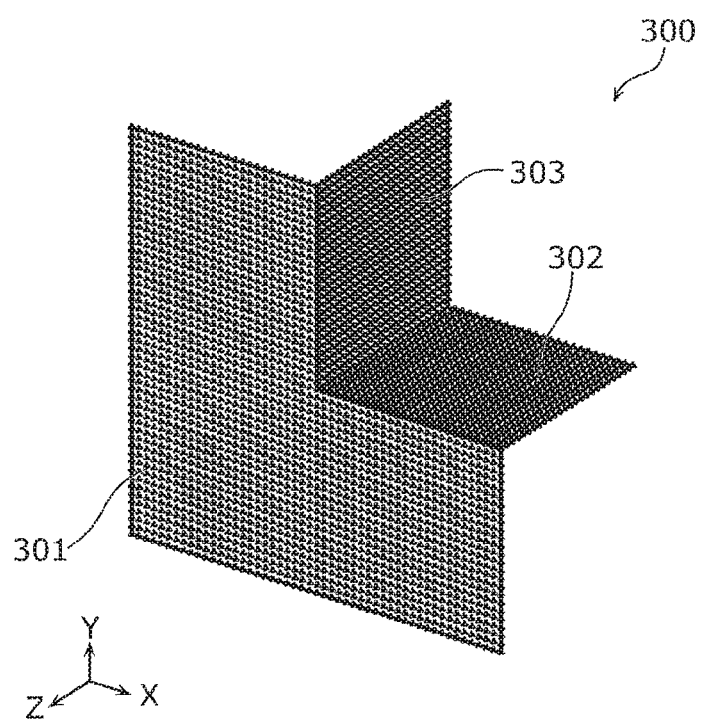
FIG. 4 is a perspective view illustrating a corner model and a model value group present on surfaces.

In the present preferred embodiment, since the shape of the opening 210 is a rectangle, for example, a corner model 300 preferably includes: an L-shaped first surface 301 (the surface in the XY plane in FIG. 4); a second surface 302 (the surface in the XZ plane in the figure) located perpendicular or substantially perpendicular to the first surface 301 and extending from one inner side of the first surface 301; and a third surface 303 (the surface in the YZ plane in the figure) located perpendicular or substantially perpendicular to the first surface 301 and extending from another inner side of the first surface 301, as illustrated in FIG. 4. The first surface 301, the second surface 302, and the third surface 303 cross one another at one point and are perpendicular or substantially perpendicular to one another.

In the present preferred embodiment, in addition to the model illustrated in FIG. 4, three other models obtained by rotating the model by 90 degrees, 180 degrees, and 270 degrees, respectively, around the Z axis in FIG. 4, so as to correspond to the four corners of the rectangular opening 210 may be present as the corner model 300.

The model value group generator 132 generates model values that are three-dimensional data indicating the positions of a plurality of points present on the first surface 301, the second surface 302, and the third surface 303 of the three-dimensional L-shaped corner model 300, and generates a model value group.

At this point, the model value group generator 132 generates a model value group so that the space density of the actual measured values obtained by the actual measured value receiver 131, which, in other words, is the density of the points that can be measured by the sensor 102, and the space density of the model values are equal or substantially equal. Therefore, it is possible to improve the accuracy of identifying the state of the object 200.

The model feature value calculator 133 is a processor that calculates a model feature value based on at least one model value included in the model value group generated by the model value group generator 132.

The method of calculating a model feature value is not particularly limited. For example, the model feature value may be calculated using a normal direction histogram generated based on the angle between the normal direction vector of each model value and the normal direction vector of a surrounding model value. Specifically, fast point feature histograms (FPFH) are able to be used. Furthermore, since the model value is position information, the model feature value calculator 133 may generate a distance histogram between the model values as the model feature value.

In the present preferred embodiment, the model feature value calculator 133 calculates a model feature value based on the model value that is included in the model value group and corresponds to a corner. The model value used as the standard herein may be a model value present on an edge (an angular portion) of the corner model 300 aside from the corners of the corner model 300, i.e., the model values corresponding to the points at which the first surface 301, the second surface 302, and the third surface 303 cross one another.

Furthermore, the model feature value calculator 133 determines, as a local region, a predetermined three-dimensional region including the model value used as the standard, and calculates, as the model feature value, the number of model values included in each unit region obtained by dividing the local region.

Figure 5:
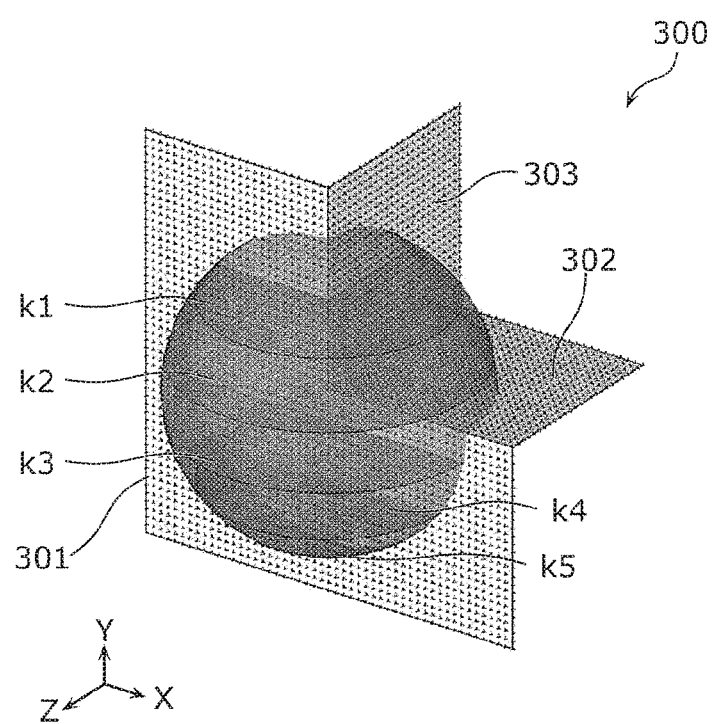
FIG. 5 illustrates the relationship between a local region, a unit region, and a corner model that calculates a model feature value.

In the present preferred embodiment, as illustrated in FIG. 5, the model feature value calculator 133 sets a spherical local region centered on a model value corresponding to a corner or angular portion of the corner model 300, and calculates a model feature value fm based on the number k of model values included in a unit region obtained by dividing the spherical local region into regions separated vertically (in the Y axis direction in the figure) by planes parallel or substantially parallel to the ZX plane in the figure.

Note that the way to divide the local region is not particularly limited, but it is preferable that the local region be divided by planes parallel or substantially parallel to one of the surfaces of the corner model 300. Alternatively, the local region may be divided by planes parallel or substantially parallel to a surface on which the object 200 is placed, planes parallel or substantially parallel to a surface on which the sensor 102 is provided, or planes parallel or substantially parallel to a surface on which the carrier 100 runs, for example. Furthermore, the number of divisions and whether or not to equally divide the local region are not particularly limited.

For example, in the case where the local region is divided by n, the equation fm=(k1/K, k2/K, ... kn/K) holds where fm represents a model feature value, k1, k2, ... kn represent the number of model values in unit regions, and K represents a total number of model values in the local region.

The actual measured value receiver 131 is a processor that receives or obtains from the sensors 102 actual measured values indicating the positions of a plurality of points on the flat portion 201 of the object 200 with respect to the sensor 102, and the distance of the plurality of points to the sensor 102, which are measured by the sensor 102.

Figure 3:
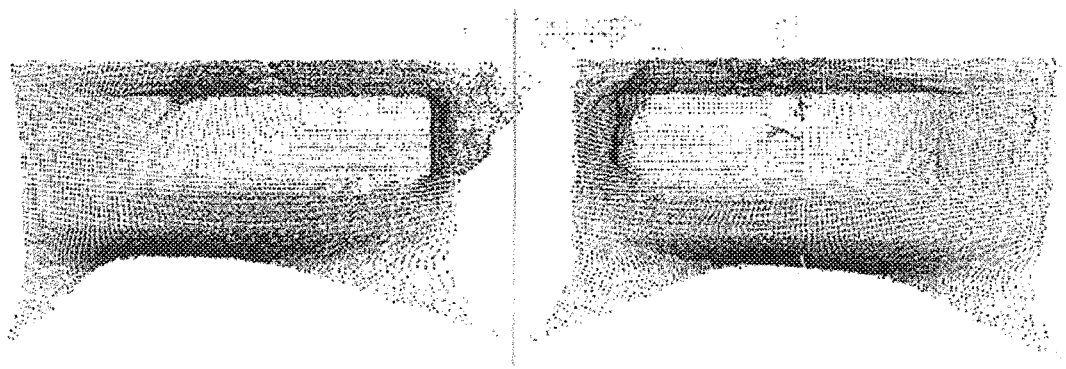
FIG. 3 is a visual illustration of actual measured values obtained by a sensor.

In the present preferred embodiment, the carrier 100 includes the sensors 102, each of which preferably is a TOF camera at the distal end of the fork 101, and each of the sensors 102 measures the flat portion 201 that includes and surrounds one of the openings 210. The actual measured value receiver 131 integrates the actual measured values obtained from the sensors 102 in consideration of the positional relationship between the sensors 102. When the integrated actual measured values are represented as a two-dimensional image, an image such as that illustrated in FIG. 3 is obtained.

The actual feature value calculator 134 is a processor that, based on each actual measured value obtained by the actual measured value receiver 131, calculates an actual feature value by the same method as the method by which the model feature value calculator 133 calculates the model feature value.

For example, the equation fr=(m1/M, m2/M, ... mn/M) holds where fr is the actual feature value, m1, m2, ..., mn are each the number of actual measured values in a unit region, and M is a total number of actual measured values in the local region. The actual feature value calculator 134 calculates an actual feature value for every actual measured value, for example.

The corresponding point extractor 135 is a processor that compares the model feature value calculated by the model feature value calculator 133 and stored in the storage 137 with the actual feature value calculated by the actual feature value calculator 134, and extracts a corresponding point value indicating a corresponding point that is present on the flat portion 201 and corresponds to the actual measured value used as the standard for the actual feature value that matches the model feature value.

In the present preferred embodiment, the corresponding point extractor 135 matches the actual feature values to the model feature values of the corner model 300 that correspond to the four corners of the opening 210. The matching is performed based on the degree of similarity between the model feature values and the actual feature values. Specifically, for fr within a predetermined threshold value range of fm, the actual measured value used as the standard for the local region from which the fr is calculated is extracted as a corresponding point.

Furthermore, the actual feature value may be matched to the model feature value of the corner model 300 that corresponds to an edge (an angular portion) other than the corners.

Note that the corresponding point extractor 135 may extract depth information from the actual measured value involved in the calculation of the actual feature value and match the actual feature value to the model feature value after multiplication of the actual feature value by a coefficient that is a value proportional to a depth variance. The value proportional to the depth variance is, for example, a value obtained by normalizing a variance. Therefore, the difference between the flat portion 201 and the remaining portion becomes significant, making it easy to determine the flat portion 201.

Upon the extraction of a corresponding point, it is sufficient that the actual feature value be matched to the model feature value based on the corner model 300 that corresponds to at least two of the corners that are on a diagonal line.

Furthermore, the corresponding point extractor 135 may perform down-sampling on the actual measured value. For example, one or more pairs of actual measured values that have a particular geometric relationship may be extracted from the actual measured values, and if the angle between line segments connecting the points separated each other by a distance in a predetermined range is within a predetermined range, down-sampling in which these three feature points are set as candidate matching points may be performed. The corresponding point extractor 135 may perform down-sampling in which midpoints between a feature point located at the center and other two feature points may be set as candidate points for pattern matching. This down-sampling may be performed in the actual feature value calculator 134.

The object state identifier 136 is a processor that identifies the object state including at least one of the position and the posture of the object with respect to the sensor 102 based on the corresponding point value extracted by the corresponding point extractor 135.

Figure 6:
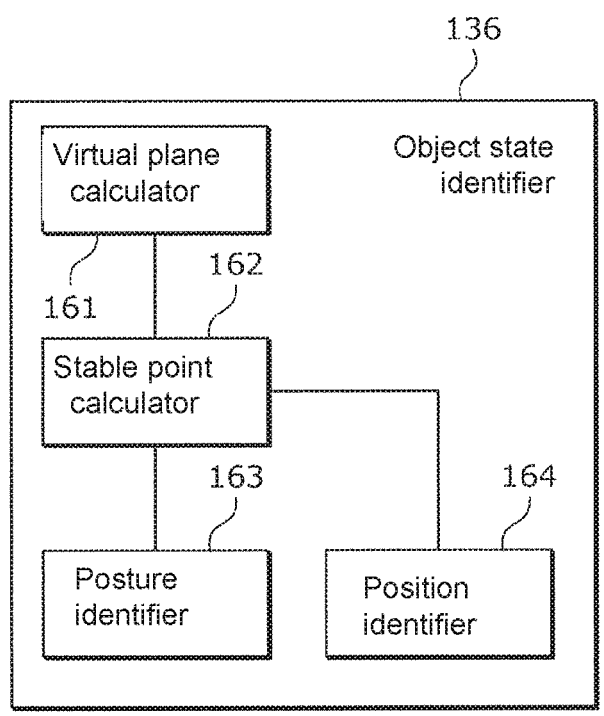
FIG. 6 is a block diagram illustrating a functional configuration of an object state identifier in detail.

FIG. 6 is a block diagram illustrating a functional configuration of the object state identifier 136 in detail.

As illustrated in FIG. 6, the object state identifier 136 includes a virtual plane calculator 161, a stable point calculator 162, a posture identifier 163, and a position identifier 164.

The virtual plane calculator 161 is a processor that calculates a plane equation representing a plane including the flat portion 201 based on the corresponding point value extracted by the corresponding point extractor 135. The method of calculating a plane equation is not particularly limited, but in the present preferred embodiment, the corresponding points extracted by the corresponding point extractor 135 are considered to include noise, and therefore a method of estimating a parameter in a plane equation with outliers removed (for example, random sample consensus (RANSAC) or the like) is preferably used.

The stable point calculator 162 is a processor that extracts, as a stable point, an actual measured value that is in a virtual plane calculated by the virtual plane calculator 161.

The actual measured value that is in the virtual plane herein means not only the actual measured value that satisfies the plane equation calculated by the virtual plane calculator 161, but also an actual measured value that satisfies the plane equation within a range of error.

The posture identifier 163 is a processor that identifies the posture of the object 200 based on a stable point. The posture preferably is the orientation of the object 200 with respect to the sensor 102. Specifically, for example, the posture is a three-dimensional angle between a representative axis indicating the orientation of the object 200 and a measurement axis connecting the sensor 102 and the center of the measurement region covered by the sensor 102. In the present preferred embodiment, since the object 200 which is a pallet and the carrier 100 are arranged in the same plane (on the same floor surface), the posture of the object 200 is an angle between a straight-ahead direction of the carrier 100 and a representative axis which is an axis of the through-hole that defines the opening 210.

The method used by the posture identifier 163 to identify a posture is not particularly limited. For example, the normal to the virtual plane determined by the virtual plane calculator 161 may be set as a representative axis indicating the orientation of the object 200, to identify the posture of the object 200 in accordance with the straight-ahead direction of the carrier 100 obtained from the carrier 100 or the like.

In the present preferred embodiment, stable points are projected on a surface that intersects with the virtual plane and corresponds to the floor surface on which the object 200 and the carrier 100 are arranged, a front point group that is one or more points located in a front area is extracted from the obtained projected point group, and the posture of the object 200 is identified based on this front point group. The method of identifying the posture of the object 200 based on the front point group is not particularly limited. In the present preferred embodiment, the front points are considered to include noise, and therefore, a method of estimating a parameter in a straight-line equation with outliers removed (for example, random sample consensus (RANSAC) or the like) is preferably used, as in the case where the plane equation is created. This makes it possible to accurately identify the posture of the object 200.

Figure 7A:
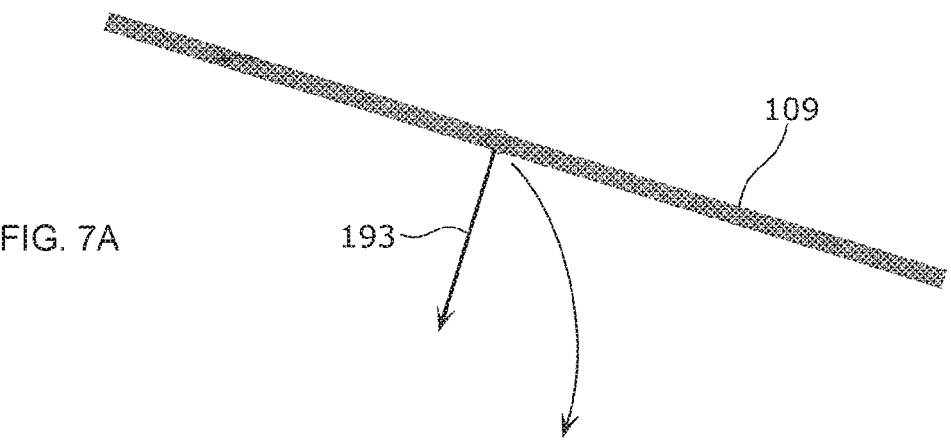
FIGS. 7A-7C are visual illustrations of processing operations of a posture identifier.
Figure 7B:
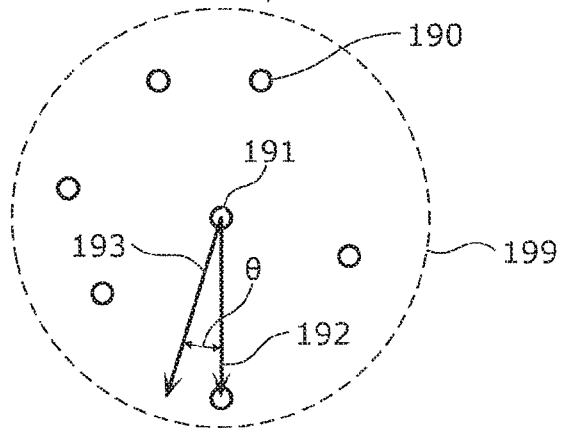
Figure 7C:
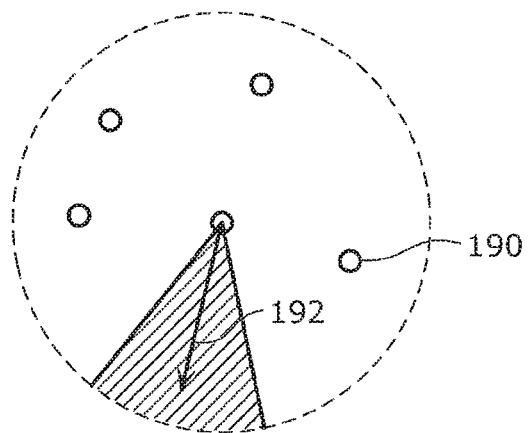

The front point is identified as follows. As illustrated in FIG. 7A, a projected point group 109 is a linear collection of projected points. In FIG. 7A, the projected points are aligned in the shape of a rectangular band, for example. In reality, the projected points are arranged at random while maintaining the shape of a band. Next, as illustrated in FIG. 7B, one point among projected points 190 is defined as an interest point 191, and a projected point 190 included in a region 199 (in the shape of a circle in the present preferred embodiment) including the interest point 191 is extracted. An angle θ is calculated which is an angle between an interest point vector 192 which is a vector from the interest point 191 to each of the extracted, projected points 190 and a normal vector 193 which is normal to the virtual plane determined by the virtual plane calculator 161. In the case where the angle θ is not included in a predetermined angle range (indicated by the diagonal lines in FIG. 7C), that is, in the case where there are no other projected points 190 within the predetermined angle range centered on the interest point vector 192, the interest point 191 is identified as the front point. In this way, each of two or more different projected points is defined as the interest point 191 to identify a front point, and the front point group is thus extracted.

The position identifier 164 identifies a center position of the opening 210 based on the stable points calculated by the stable point calculator 162, and identifies the position of the center of the opening 210 as the position of the object 200.

The method of identifying the center position of the opening 210 is not particularly limited; examples of the method include the following non-limiting exemplary methods.

Example 1 of Position Identification Method

Figure 8:
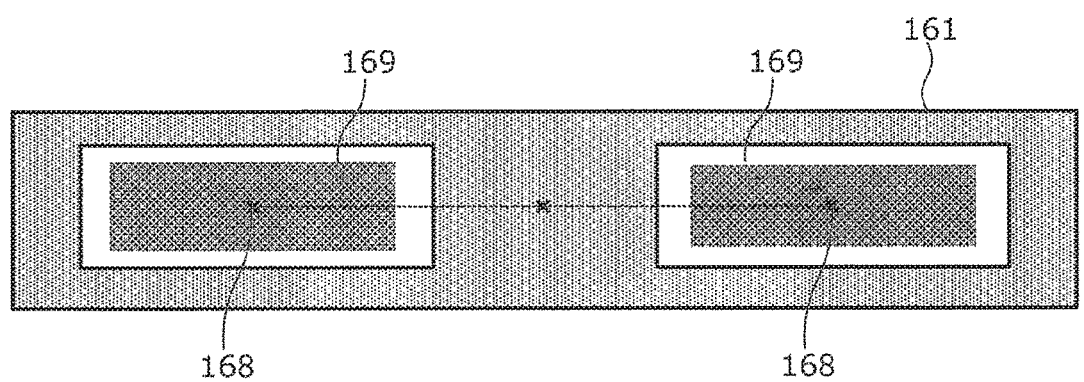
FIG. 8 is a visual illustration of processing operations to determine the center of an opening from a virtual plane.

First, temporary points are generated at random in the virtual plane determined by the virtual plane calculator 161. Next, the temporary points that are located near the stable points are removed. As a result of the removal, a remaining point group 169 is of a shape such as that illustrated in FIG. 8. Next, the centroid (the center) of the remaining point group that is made up of the remaining temporary points is calculated. The position of the calculated centroid (the calculated center) is a center position 168 of the opening 210.

In the present preferred embodiment, the object 200, which is a pallet, preferably includes two openings 210 in the flat portion 201. The two openings 210 are arranged in a plane parallel or substantially parallel to the plane (the floor surface) on which the object 200 is placed. Therefore, the position identifier 164 calculates center positions of the two respective openings 210 and identifies, as the position of the object 200, the midpoint of the line segment connecting these two center positions.

Note that when the center positions of the two respective openings 210 are calculated, the stable points may be clustered into two classes beforehand so that the center position of each of the openings 210 is calculated based on the stable points that belong to a corresponding one of the two classes.

Example 2 of Position Identification Method

In the present preferred embodiment, the object 200, which is a pallet, preferably includes two openings 210 in the flat portion 201. The two openings 210 are arranged in a plane parallel or substantially parallel to the plane (the floor surface) on which the object 200 is placed, and have the same shape. Under the above premise, the position of the object 200 is identified based on the axis of line symmetry of the arrangement of the stable points.

Figure 9:
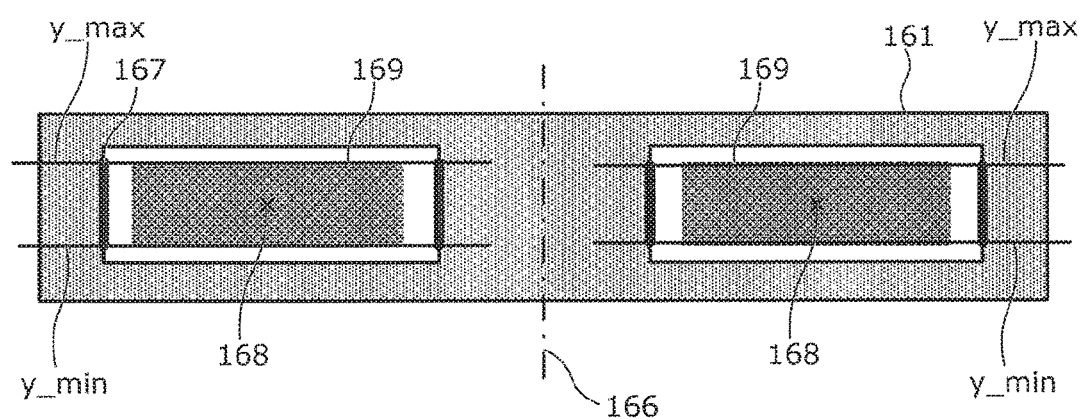
FIG. 9 is a visual illustration of processing operations to determine the position of an object from a virtual plane.

First, temporary points are generated at random in the virtual plane determined by the virtual plane calculator 161. Next, the temporary points that are located near the stable points are removed. As a result of the removal, a remaining point group 169 is of a shape such as that illustrated in FIG. 9. The remaining point group is made up of the remaining temporary points. The maximum value y_max and the minimum value y_min of the remaining temporary points in the vertical direction (the Y-axis direction) are calculated from the remaining point group. The innermost stable point is then extracted from the stable points included in the range from the maximum value y_max to the minimum value y_min, and a linear edge component 167 is extracted. Next, a fold line 166 is searched for and determined, across which the positioning error of the edge components 167 is smallest if the virtual plane is folded along the axis extending in the vertical direction and passing through the midpoint of the line segment connecting the previously calculated center positions, for example, the centers of the two respective openings 210. The fold line 166 determined in this way is regarded as the position of the object 200.

Note that when the edge components 167 of the two respective openings 210 are calculated, the stable points may be clustered into two classes beforehand so that each of the edge components 167 may be calculated based on the stable points that belong to a corresponding one of the two classes.

The following will describe the operation to the point when the carrier 100 in the carrier system 110 holds the object 200.

Figure 10:
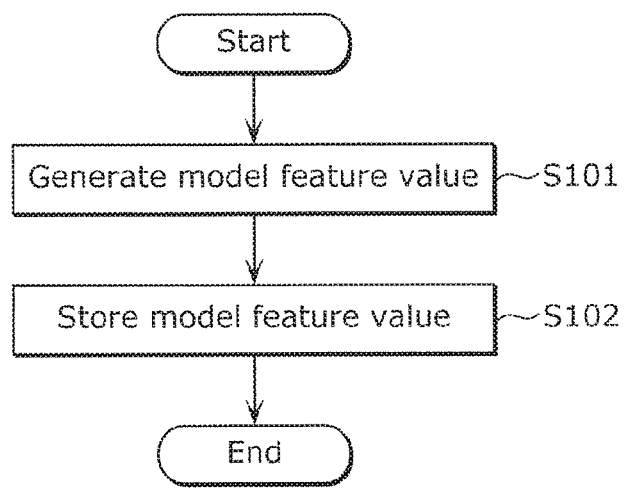
FIG. 10 is a flowchart showing the flow of processes on a model feature value in a preparatory stage.

FIG. 10 is a flowchart showing the flow of processes on a model feature value in a preparatory stage.

First, as a preparation, the model feature value calculation apparatus 130 generates a model value group which is a set of model values indicating the positions of a plurality of points present on at least three different surfaces of the corner model 300, and calculates a model feature value based on at least one model value included in the model value group (S101).

Next, the generated model feature value is stored in the storage 137 of the carrier 100 (S102).

Figure 11:
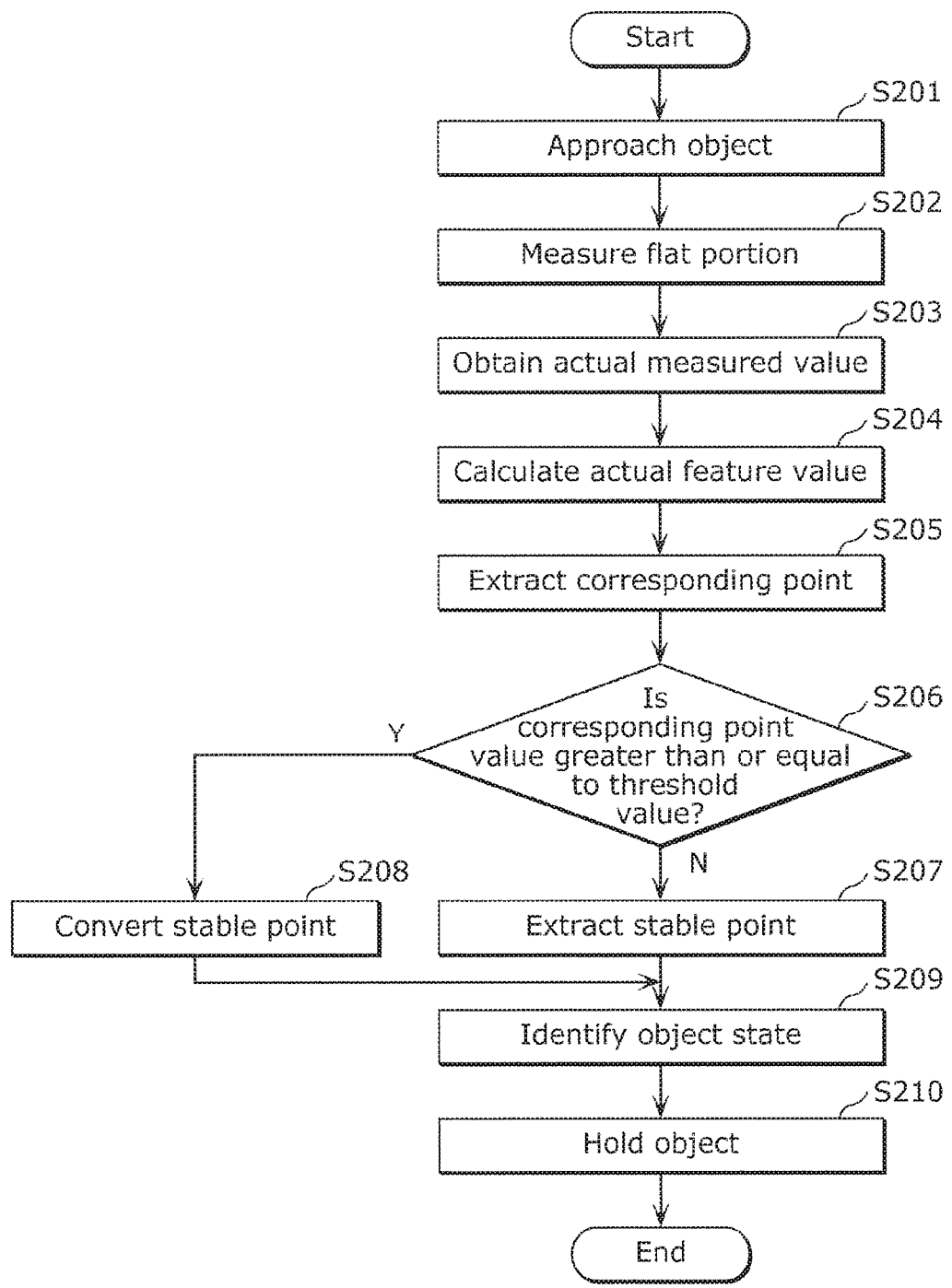
FIG. 11 is a flowchart showing the flow to the point when a carrier holds an object.

FIG. 11 is a flowchart showing the flow to the point when the carrier holds the object.

The pallet that is the object 200 is placed, for example, at a storage and retrieval station in an automated warehouse. The carrier 100 receives a command to carry the object 200 present at the station and then, by referring to a map or the like stored therein, approaches the station at which the object 200 is placed with the fork 101 directed toward the object 200 (S201).

Next, the sensor 102 attached to the distal end of the fork 101 is operated, and the positions of a plurality of points on the flat portion 201 of the object 200 and the distances to the plurality of points are three-dimensionally measured (S202).

The actual measured value receiver 131 obtains or receives an actual measured value as data from the sensor 102 (S203).

When the actual measured value is obtained, the actual feature value calculator 134 calculates an actual feature value for each actual measured value (S204). Note that in the case where processing takes time because there are many actual measured values, the actual feature value may be calculated after down-sampling is performed using the above-described methods, for example.

Next, the calculated actual feature value is matched to the model feature value stored in the storage 137, and the actual measured value used as the standard for the actual feature value indicating the degree of similarity in a predetermined range is extracted as a corresponding point value (S205).

When the corresponding point value is less than a predetermined threshold value (S206: N), the object state identifier 136 determines a virtual plane and extracts a stable point (S207).

When the corresponding point value is greater than or equal to the predetermined threshold value (S206: Y), the object state identifier 136 converts the corresponding point into a stable point (S208).

Next, the object state identifier 136 identifies an object state based on the stable point (S209).

At the end, the carrier 100 performs a feedback control on the steering wheel, the driving wheel, or the like according to the obtained object state, and at the stage where the axis of the through-hole including the opening 210 at an end and the axis of the fork 101 coincide with each other, inserts the fork 101 into the opening 210 to lift and hold the object 200 (S210).

According to a preferred embodiment of the present invention, as a result of focusing on the edge of the opening 210, the actual feature value is matched to the model feature value that strongly represents the features of the edge of the opening 210, to extract a stable point, and thus it is possible to identify the position, posture, etc., of the object 200 quickly and accurately.

Furthermore, the corner model is used to extract the stable point to identify the position and posture of the object. Therefore, even when the type of the object 200, for example, the type of the pallet, is unknown, and/or the size of the opening 210, the position of the opening 210 in the flat portion 201, or the like is unknown, it is possible to identify the position of the opening 210, the position and posture of the object 200, and the like.

Furthermore, as a result of focusing on the opening 210, even when only the number of points included in the unit region obtained by dividing the local region is set as the feature value, the accuracy of extracting a corresponding point falls within an allowable range, and it is possible to extract the stable point faster.

Thus, the carrier 100 including the object state identification apparatus 103 that achieves the functions described above is able to recognize the position and posture of the object 200 quickly and accurately, making it possible to hold and carry the object 200 quickly and smoothly.

Note that the present invention is not limited to the above preferred embodiments. For example, another preferred embodiment realized by arbitrarily combining structural elements or excluding some structural elements described herein may be included as a preferred embodiment of the present invention. Furthermore, variations obtained by various modifications to the foregoing preferred embodiments that can be conceived by a person having ordinary skill in the art, that are within the scope of the essence of the present invention, that is, the intended teachings of the recitations in the claims, are also included in the present invention.

For example, the actual measured value may be obtained by analyzing a plurality of images, and in this case, in the matching for extracting a corresponding point, a predetermined number of feature points that meet a predetermined geometric condition may be extracted as candidate matching points.

Furthermore, in the detection of an image feature point, the Harris algorithm or the scale-invariant feature transform (SIFT) algorithm may be used to detect a feature point. Otherwise, the intrinsic shape signatures (ISS) may be used.

As the method of detecting a feature point, it is sufficient that a significant change in color, luminance, or the like among the pixels of an image be detected, and known techniques can be used aside from the method using the Harris operator or the SIFT operator.

Furthermore, in the calculation of a feature value, it is possible to use known techniques; for example, it is possible to use the normal direction histogram, the distance histogram, the luminance-level histogram, and the like, and more specifically, the fast point feature histograms (FPFH) can be used.

Although the model is described as a virtual model, the model feature value may be calculated by measuring the object 200, the position and posture of which are known.

Although only some exemplary preferred embodiments of the present invention have been described in detail above, those skilled in the art will readily appreciate that many modifications are possible in the exemplary preferred embodiments without materially departing from the novel teachings and advantages of the present invention. Accordingly, all such modifications are intended to be included within the scope of the present invention.

Preferred embodiments of the present invention can be applied to an identification device that identifies the position and posture of the object, and is applicable, for example, to an automated guided vehicle, an object state identification apparatus that is mounted on a carrier, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An object state identification method of identifying an object state including at least one of a position and a posture of an object with respect to a sensor by obtaining actual measured values at a plurality of points on a flat portion of the object by the sensor, the actual measured values being three-dimensional data, the flat portion being on a surface of the object and including an opening, the object state identification method comprising:
generating a model value group that is a set of model values indicating positions of a plurality of points present on at least three different surfaces of a three-dimensional corner model;
calculating a model feature value based on at least one model value included in the model value group;
calculating an actual feature value based on each of the actual measured values by a method that is same as a method used to calculate the model feature value;
extracting a corresponding point value indicating a position of an edge of the opening based on the actual feature value that matches the model feature value;
identifying the object state of the object based on the corresponding point value; and
controlling a carrier for carrying the object based on the object state of the object.

2. The object state identification method according to claim 1, wherein the model feature value is calculated based on a model value included in the model value group and corresponding to a corner.

3. The object state identification method according to claim 1, wherein a local region is set based on at least one model value included in the model value group, and a total number of model values included in a unit region obtained by dividing the local region or a value calculated from the total number of model values is calculated as the model feature value.

4. The object state identification method according to claim 1, wherein depth information is extracted from the actual measured value involved in the calculation of the actual feature value, the actual feature value is multiplied by a coefficient that is a value proportional to a depth variance, the actual feature value after the multiplication is matched to the model feature value, and the corresponding point value indicating the position of the edge of the opening is extracted based on the actual feature value that matches the model feature value.

5. The object state identification method according to claim 1, wherein the model value group is generated so that spatial density of the actual measured values and spatial density of the model values are equal or substantially equal.

6. An object state identification apparatus, comprising:
an actual measured value receiver that obtains actual measured values at a plurality of points on a flat portion of an object from a sensor, the actual measured values being three-dimensional data, the flat portion being on a surface of the object and including an opening;
a storage that stores a model feature value calculated based on at least one model value included in a model value group that is a set of model values indicating positions of a plurality of points present on at least three different surfaces of a three-dimensional corner model;
an actual feature value calculator that calculates an actual feature value based on each of the actual measured values by a method that is same as a method used to calculate the model feature value;
a corresponding point extractor that extracts a corresponding point value indicating a position of an edge of the opening based on the actual feature value that matches the model feature value; and
an object state identifier that identifies, based on the corresponding point value, an object state including at least one of a position and a posture of the object with respect to the sensor; wherein
the object state identified by the object state identifier is used to control a carrier for carrying the object.

7. A carrier for carrying an object with a fork inserted into an opening of a flat portion of the object, the flat portion being on a surface of the object, the carrier comprising:
a sensor that obtains actual measured values at a plurality of points on the flat portion of the object, the actual measured values being three-dimensional data; and
an object state identification apparatus that identifies, based on the actual measured values, an object state including at least one of a position and a posture of the object with respect to the sensor; wherein
the object state identification apparatus includes:
a storage that stores a model feature value calculated based on at least one model value included in a model value group that is a set of model values indicating positions of a plurality of points present on at least three different surfaces of a three-dimensional corner model;

an actual feature value calculator that calculates an actual feature value based on each of the actual measured values by a method that is same as a method used to calculate the model feature value;
a corresponding point extractor that extracts a corresponding point value indicating a position of an edge of the opening based on the actual feature value that matches the model feature value; and
an object state identifier that identifies the object state based on the corresponding point value; and the carrier is controlled based on the object state identified by the object state identifier.

* * * * *